(12) United States Patent
Chappell et al.

(10) Patent No.: US 9,893,811 B2
(45) Date of Patent: Feb. 13, 2018

(54) ARCHITECTURE FOR A WIRELESS NETWORK

(71) Applicant: CommScope Technologies LLC, Hickory, NC (US)

(72) Inventors: Eric Ryan Chappell, Statesville, NC (US); Thomas P. Huegerich, Manchester Center, VT (US); Wayne M. Kachmar, North Bennington, VT (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 6 days.

(21) Appl. No.: 14/778,470

(22) PCT Filed: Mar. 18, 2014

(86) PCT No.: PCT/US2014/030969
§ 371 (c)(1),
(2) Date: Sep. 18, 2015

(87) PCT Pub. No.: WO2014/197103
PCT Pub. Date: Dec. 11, 2014

(65) Prior Publication Data
US 2016/0294475 A1    Oct. 6, 2016

Related U.S. Application Data

(60) Provisional application No. 61/802,989, filed on Mar. 18, 2013.

(51) Int. Cl.
*H04B 10/00*    (2013.01)
*H04B 10/2575*    (2013.01)
(Continued)

(52) U.S. Cl.
CPC .......... *H04B 10/25752* (2013.01); *H02J 9/00* (2013.01); *H04B 10/808* (2013.01); *G02B 6/4416* (2013.01)

(58) Field of Classification Search
CPC ............ H04B 10/25753; H04B 10/808; H04B 10/806; H04B 2203/547; H04W 88/085; H04Q 11/0067
(Continued)

(56) References Cited

U.S. PATENT DOCUMENTS 4,089,585 A    5/1978    Slaughter
4,199,225 A    4/1980    Slaughter
(Continued)

FOREIGN PATENT DOCUMENTS

EP    0 629 889 A1    12/1994
EP    1 650 888 A1    4/2006
(Continued)

OTHER PUBLICATIONS

"GE—Critical Power, DAS and Small Cell Powering Architectures," DAS and Small Cell Congress, May 1, 2013; 22 pages.
(Continued)

*Primary Examiner* — Don N Vo
(74) *Attorney, Agent, or Firm* — Merchant & Gould P.C.

(57) ABSTRACT

A ferrule for a fiber optic connector includes: a main body extending from a first end to a second end, the main body defining a bore extending from the first end to the second end; an end surface at the second end of the main body; and a raised portion on the end surface, the raised portion extending from the second end and surrounding the bore; wherein an optical fiber is configured to be positioned within the bore of the main body; and wherein the end surface is configured to be polished to remove the raised portion.

7 Claims, 4 Drawing Sheets

(51) Int. Cl.
*H04B 10/80* (2013.01)
*H02J 9/00* (2006.01)
*G02B 6/44* (2006.01)

(58) Field of Classification Search
USPC .......................................................... 398/116
See application file for complete search history.

(56) References Cited

U.S. PATENT DOCUMENTS

| | | | |
|---|---|---|---|
| 4,220,812 A | 9/1980 | Ney et al. | |
| 4,359,598 A | 11/1982 | Dey et al. | |
| 4,365,865 A | 12/1982 | Stiles | |
| 4,467,138 A | 8/1984 | Brorein | |
| 4,497,537 A | 2/1985 | Dench | |
| 4,552,432 A | 11/1985 | Anderson et al. | |
| 4,695,127 A | 9/1987 | Ohlhaber et al. | |
| 4,723,832 A | 2/1988 | Okazato et al. | |
| 4,729,628 A | 3/1988 | Kraft et al. | |
| 4,761,053 A | 8/1988 | Cogelia et al. | |
| 4,787,705 A | 11/1988 | Shinmoto et al. | |
| 4,867,527 A | 9/1989 | Dotti et al. | |
| 4,895,426 A | 1/1990 | Pinson | |
| 5,268,971 A | 12/1993 | Nilsson et al. | |
| 5,448,670 A | 9/1995 | Blew et al. | |
| 5,469,523 A | 11/1995 | Blew et al. | |
| 5,494,461 A | 2/1996 | Bippus et al. | |
| 5,539,851 A | 7/1996 | Taylor et al. | |
| 5,555,336 A | 9/1996 | Winslow | |
| 5,555,338 A | 9/1996 | Haag et al. | |
| 5,557,698 A | 9/1996 | Gareis et al. | |
| 5,651,081 A | 7/1997 | Blew et al. | |
| 5,677,974 A | 10/1997 | Elms et al. | |
| 5,737,470 A | 4/1998 | Nagano et al. | |
| 5,745,627 A | 4/1998 | Arroyo et al. | |
| 5,778,116 A | 7/1998 | Tomich | |
| 5,838,858 A | 11/1998 | White | |
| 5,896,480 A | 4/1999 | Scharf et al. | |
| 5,913,003 A | 6/1999 | Arroyo et al. | |
| 5,982,966 A | 11/1999 | Bonicel | |
| 6,142,802 A | 11/2000 | Berg et al. | |
| 6,169,834 B1 | 1/2001 | Keller | |
| 6,195,487 B1 | 2/2001 | Anderson et al. | |
| 6,236,789 B1 | 5/2001 | Fitz | |
| 6,343,172 B1 | 1/2002 | Schiestle | |
| 6,347,172 B1 | 2/2002 | Keller et al. | |
| 6,363,192 B1 | 3/2002 | Spooner | |
| 6,370,303 B1 | 4/2002 | Fitz et al. | |
| 6,463,198 B1 | 10/2002 | Coleman | |
| 6,493,491 B1 | 12/2002 | Shen et al. | |
| 6,542,674 B1 | 4/2003 | Gimblet | |
| 6,567,592 B1 | 5/2003 | Gimblet et al. | |
| 6,599,025 B1 | 7/2003 | Deutsch | |
| 6,621,964 B2 | 9/2003 | Quinn et al. | |
| 6,687,437 B1 | 2/2004 | Starnes et al. | |
| 6,719,461 B2 | 4/2004 | Cull | |
| 6,738,547 B2 | 5/2004 | Spooner | |
| 6,755,575 B2 | 6/2004 | Kronlund et al. | |
| 6,758,693 B2 | 7/2004 | Inagaki et al. | |
| 6,836,603 B1 | 12/2004 | Bocanegra et al. | |
| 6,847,767 B2 | 1/2005 | Hurley et al. | |
| 6,931,183 B2 | 8/2005 | Panak et al. | |
| 6,965,718 B2 | 11/2005 | Koertel | |
| 7,006,740 B1 | 2/2006 | Parris | |
| 7,158,703 B2 | 1/2007 | Mjelstad | |
| 7,218,821 B2 | 5/2007 | Bocanegra et al. | |
| 7,225,534 B2 | 6/2007 | Kachmar | |
| 7,272,281 B2 | 9/2007 | Stahulak et al. | |
| 7,310,430 B1 | 12/2007 | Mallya et al. | |
| 7,362,936 B2 | 4/2008 | Stark et al. | |
| 7,371,014 B2 | 5/2008 | Willis et al. | |
| 7,387,517 B2 | 6/2008 | Kusuda et al. | |
| 7,401,985 B2 | 7/2008 | Aronson et al. | |
| 7,445,389 B2 | 11/2008 | Aronson | |
| 7,494,287 B2 | 2/2009 | Wang et al. | |
| 7,499,616 B2 | 3/2009 | Aronson et al. | |
| 7,643,631 B2 | 1/2010 | Kennedy | |
| 7,643,713 B2 | 1/2010 | Bëthe et al. | |
| 7,692,098 B2 | 4/2010 | Wyatt, II et al. | |
| 7,712,976 B2 | 5/2010 | Aronson et al. | |
| 7,744,288 B2 | 6/2010 | Lu et al. | |
| 7,762,727 B2 | 7/2010 | Aronson | |
| 7,778,510 B2 | 8/2010 | Aronson et al. | |
| 7,876,989 B2 | 1/2011 | Aronson et al. | |
| 7,897,873 B2 | 3/2011 | Gemme et al. | |
| 7,918,609 B2 | 4/2011 | Melton et al. | |
| 8,041,166 B2 | 10/2011 | Kachmar | |
| 8,059,929 B2 | 11/2011 | Cody et al. | |
| 8,083,417 B2 | 12/2011 | Aronson et al. | |
| 8,155,525 B2 | 4/2012 | Cox | |
| 8,175,433 B2 | 5/2012 | Caldwell et al. | |
| 8,184,935 B2 | 5/2012 | Kachmar | |
| 8,204,348 B2 | 6/2012 | Keller et al. | |
| 8,238,706 B2 | 8/2012 | Kachmar | |
| 8,244,087 B2 | 8/2012 | Sales Casals et al. | |
| 8,249,410 B2 | 8/2012 | Andrus et al. | |
| 8,270,838 B2 | 9/2012 | Cox | |
| 8,290,320 B2 | 10/2012 | Kachmar | |
| 8,297,854 B2 | 10/2012 | Bickham et al. | |
| 8,301,003 B2 | 10/2012 | de los Santos Campos et al. | |
| 8,328,433 B2 | 12/2012 | Furuyama | |
| 8,363,994 B2 | 1/2013 | Kachmar | |
| 8,480,312 B2 | 7/2013 | Smith et al. | |
| 2002/0126967 A1 | 9/2002 | Panak et al. | |
| 2002/0136510 A1 | 9/2002 | Heinz et al. | |
| 2002/0147978 A1 | 10/2002 | Dolgonos et al. | |
| 2003/0108351 A1 | 6/2003 | Feinberg et al. | |
| 2003/0202756 A1 | 10/2003 | Hurley et al. | |
| 2003/0215197 A1 | 11/2003 | Simon et al. | |
| 2004/0258165 A1 | 12/2004 | Peltonen | |
| 2005/0002622 A1 | 1/2005 | Sutehall et al. | |
| 2005/0185903 A1 | 8/2005 | Koertel | |
| 2006/0153516 A1 | 7/2006 | Napiorkowski et al. | |
| 2006/0165355 A1 | 7/2006 | Greenwood et al. | |
| 2007/0248358 A1 | 10/2007 | Sauer | |
| 2007/0269170 A1 | 11/2007 | Easton et al. | |
| 2008/0037941 A1 | 2/2008 | Mallya | |
| 2008/0131132 A1 | 6/2008 | Solheid et al. | |
| 2008/0219621 A1 | 9/2008 | Aldeghi et al. | |
| 2008/0260389 A1* | 10/2008 | Zheng ................ H04Q 11/0067 398/115 |
| 2009/0041413 A1 | 2/2009 | Hurley | |
| 2009/0297104 A1 | 12/2009 | Kachmar | |
| 2010/0150556 A1 | 6/2010 | Soto et al. | |
| 2010/0200270 A1 | 8/2010 | Gemme et al. | |
| 2010/0209058 A1 | 8/2010 | Ott | |
| 2010/0290787 A1 | 11/2010 | Cox | |
| 2010/0321591 A1 | 12/2010 | Onomatsu | |
| 2011/0021069 A1 | 1/2011 | Hu et al. | |
| 2011/0038582 A1 | 2/2011 | DiFonzo et al. | |
| 2011/0091174 A1 | 4/2011 | Kachmar | |
| 2011/0188815 A1 | 8/2011 | Blackwell, Jr. et al. | |
| 2011/0268446 A1* | 11/2011 | Cune ................ H04B 10/25753 398/79 |
| 2011/0268452 A1 | 11/2011 | Beamon et al. | |
| 2011/0280527 A1 | 11/2011 | Tamura | |
| 2011/0293227 A1 | 12/2011 | Wu | |
| 2011/0311191 A1 | 12/2011 | Hayashishita et al. | |
| 2012/0008904 A1 | 1/2012 | Han et al. | |
| 2012/0008905 A1 | 1/2012 | Han et al. | |
| 2012/0008906 A1 | 1/2012 | Han et al. | |
| 2012/0057821 A1 | 3/2012 | Aronson et al. | |
| 2012/0080225 A1 | 4/2012 | Kim et al. | |
| 2012/0114288 A1 | 5/2012 | Wu | |
| 2012/0191997 A1 | 7/2012 | Miller | |
| 2012/0230637 A1 | 9/2012 | Kachmar | |
| 2012/0281952 A1 | 11/2012 | McColloch | |
| 2012/0281953 A1 | 11/2012 | Choi et al. | |
| 2012/0288245 A1 | 11/2012 | Hurley et al. | |
| 2012/0295486 A1 | 11/2012 | Petersen et al. | |
| 2013/0011106 A1 | 1/2013 | Congdon, II et al. | |
| 2013/0022318 A1 | 1/2013 | Fingler et al. | |
| 2013/0287349 A1 | 10/2013 | Faulkner et al. | |
| 2013/0330086 A1* | 12/2013 | Berlin ................ H04L 12/10 398/115 |

(56) References Cited

U.S. PATENT DOCUMENTS

| | | | |
|---|---|---|---|
| 2014/0072264 A1 | 3/2014 | Schroder et al. | |
| 2014/0087742 A1 | 3/2014 | Brower et al. | |
| 2014/0258742 A1 | 9/2014 | Chien et al. | |
| 2014/0314412 A1* | 10/2014 | Soto | H04L 12/2898 398/67 |
| 2014/0338968 A1 | 11/2014 | Kachmar et al. | |
| 2015/0125146 A1 | 5/2015 | Erreygers et al. | |
| 2015/0309271 A1 | 10/2015 | Huegerich et al. | |
| 2015/0378118 A1 | 12/2015 | Huegerich et al. | |
| 2016/0020911 A1 | 1/2016 | Sipes et al. | |

FOREIGN PATENT DOCUMENTS

| | | |
|---|---|---|
| EP | 2 393 220 A1 | 7/2011 |
| EP | 2 393 222 A1 | 12/2011 |
| EP | 2 676 161 A | 12/2013 |
| KR | 10-1997-0060748 A | 8/1997 |
| KR | 20-0273482 Y1 | 4/2002 |
| WO | 2010/102201 A2 | 9/2010 |
| WO | 2011/146720 A2 | 11/2011 |
| WO | 2012/112532 A2 | 8/2012 |
| WO | 2013/117598 A2 | 8/2013 |

OTHER PUBLICATIONS

International Search Report and Written Opinion for PCT/US2014/046678 dated Nov. 6, 2014.
International Search Report and Written Opinion for PCT/US2014/030969 dated Nov. 26, 2014.
OneReach PoE Extender System brochure from Berk-Tek, 8 pages (Jan. 2011).
European Search Report for EP application No. 14808346.2 dated Oct. 26, 2016 (11 pages).
European Search Report for EP application No. 14825675.3 dated Jan. 30, 2017 (7 pages).
Silvertel, "Ag5700 200W Powered Device Module" datasheet, dated Aug. 2012. Retrieved from http://www.silvertel.com/images/datasheets/Ag5700-datasheet-200W-Power-over-Ethernet-PoE-PD.pdf.
Littelfuse Inc., "Transient Suppression Devices and Principles" application note AN9768, dated Jan. 1998. Retrieved from http://www.littelfuse.com/-/media/electronics_technical/application_notes/varistors/littelfuse_transient_suppression_devices_and_principles_application_note.pdf.

* cited by examiner

ARCHITECTURE FOR A WIRELESS NETWORK

CROSS-REFERENCE TO RELATED APPLICATION(S)

This application is a National Stage of PCT International Patent application No. PCT/US2014/030969, filed 18 Mar. 2014 and claims benefit of U.S. Patent Application Ser. No. 61/802,989 filed on 18 Mar. 2013, the and which applications are incorporated herein by reference. To the extent appropriate, a claim of priority is made to each of the above disclosed applications.

TECHNICAL FIELD

The present disclosure relates generally to hybrid optical fiber and electrical communication systems.

BACKGROUND

Rapid growth of portable high-speed wireless transceiver devices (e.g., smart phones, tablets, laptop computers, etc.) continues in today's market, thereby creating higher demand for untethered contact. Thus, there is growing demand for integrated voice, data and video capable of being transmitted wirelessly at data rates of 10 Gbits/second and faster. To provide the bandwidth needed to support this demand will require the cost effective and efficient deployment of additional fixed location transceivers (i.e., cell sites or nodes) for generating both large and small wireless coverage areas.

SUMMARY

One aspect of the present disclosure relates to an architecture that allows both power and communications to be transmitted over one cable to a device for generating a cellular coverage area (e.g., macrocell, microcell, metrocell, picocell, femtocell, etc.). In certain examples, aspects of the present disclosure are particularly advantageous for deploying small coverage area devices (e.g., microcell devices, picocell devices, femtocell devices).

A further aspect of the present disclosure relates to systems, methods, and devices that facilitate the fast, low cost and simple deployment of optical fiber and power lines to interface with active devices such as devices for generating wireless communication coverage areas (e.g., wireless transceivers) and other active devices (e.g., cameras).

Still other aspects of the present disclosure relate to systems, methods and devices that facilitate the deployment of wireless communication coverage areas at various locations such as stadiums, shopping areas, hotels, high rise office buildings, multi-dwelling units, suburban environments, corporate and university campuses, in-building areas, near-building areas, tunnels, canyons, roadside areas and coastal areas.

Still further aspects of the present disclosure relate to systems and methods for enhancing the coverage areas provided by cellular technologies (e.g., GSM, CDMA, UMTS, LTE, WiMax, WiFi, etc.).

A further aspect of the present disclosure relates to a method for providing electrical power and communication signals to an active device. The method includes converting the electrical power from a first voltage to a second voltage at a first location. The method also includes transmitting the electrical power having the second voltage through a hybrid cable from the first location to a second location, and transmitting the communication signals in an optical form through the hybrid cable from the first location to the second location. The method further includes converting the electrical power to a third voltage at the second location and converting the communication signals from the optical form to an electrical form at the second location. The method additionally includes powering the active device with the electrical power having the third voltage and supplying the communication signals to the active device at the second location.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the examples disclosed herein are based.

DETAILED DESCRIPTION

Various examples will be described in detail with reference to the figures, wherein like reference numerals represent like parts and assemblies throughout the several views. Any examples set forth in this specification are not intended to be limiting and merely set forth some of the many possible variations of the inventive aspects disclosed herein.

Figure 1:
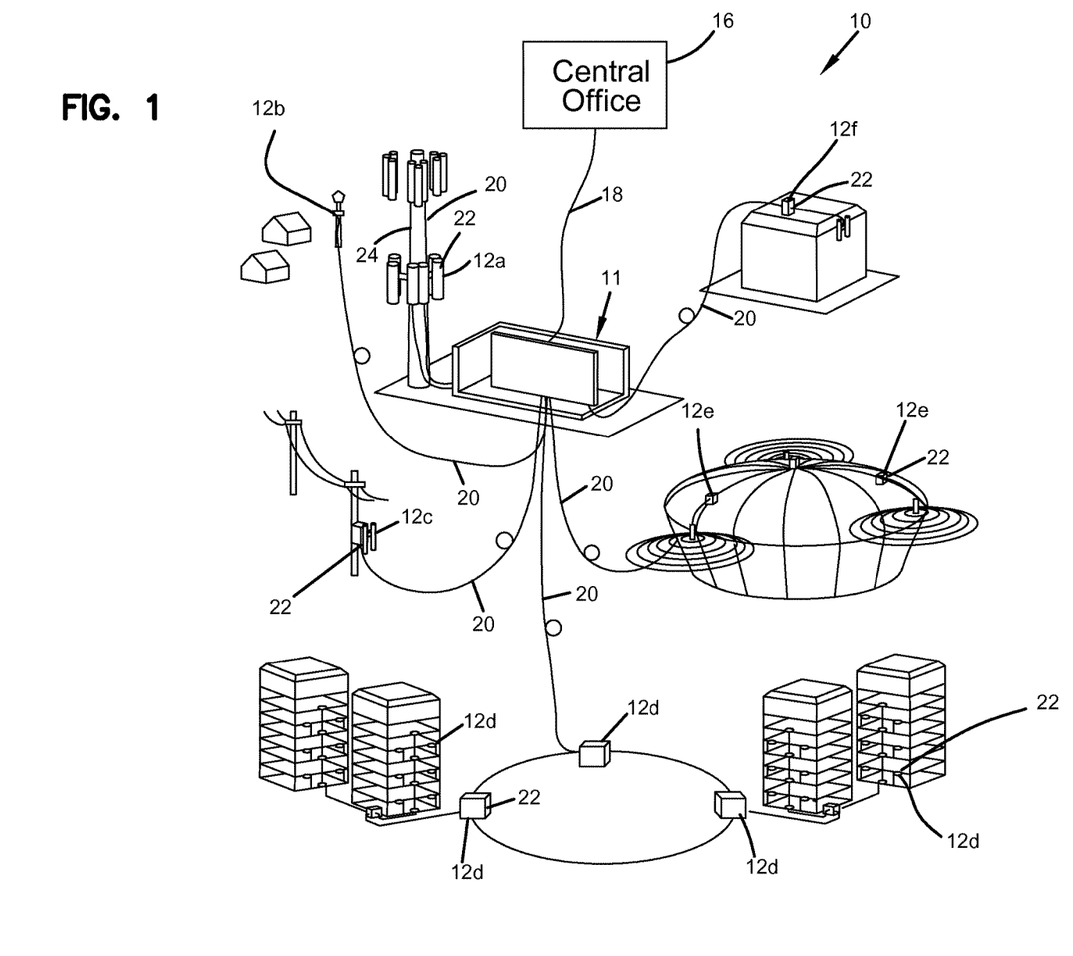
FIG. 1 shows a system diagram showing an example distribution of wireless coverage areas deployed using a hybrid cable system in accordance with the principles of the present disclosure.

FIG. 1 shows a system 10 in accordance with the principles of the present disclosure for enhancing the coverage areas provided by cellular technologies (e.g., GSM, CDMA, UMTS, LTE, WiMax, WiFi, etc.). The system 10 includes a base location 11 (i.e., a hub) and a plurality of wireless coverage area defining equipment 12a, 12b, 12c, 12d, 12e and 12f distributed about the base location 11. In certain example, the base location 11 can include a structure 14 (e.g., a closet, hut, building, housing, enclosure, cabinet, etc.) protecting telecommunications equipment such as racks, fiber optic adapter panels, passive optical splitters, wavelength division multi-plexers, fiber splice locations, optical fiber patching and/or fiber interconnect structures and other active and/or passive equipment. In the depicted example, the base location 11 is connected to a central office 16 or other remote location by a fiber optic cable such as a multi-fiber optical trunk cable 18 that provides high bandwidth two-way optical communication between the base location 11 and the central office 16 or other remote location. In the depicted example, the base location 11 is connected to the wireless coverage area defining equipment 12a, 12b, 12c, 12d, 12e and 12f by hybrid cables 20. The hybrid cables 20 are each capable of transmitting both power and communications between the base location 11 and the wireless coverage area defining equipment 12a, 12b, 12c, 12d, 12e and 12f.

The wireless coverage area defining equipment 12a, 12b, 12c, 12d, 12e and 12f can each include one or more wireless transceiver 22. The transceivers 22 can include single transceivers 22 or distributed arrays of transceivers 22. As used herein, a "wireless transceiver" is a device or arrangement of devices capable of transmitting and receiving wireless signals. A wireless transceiver typically includes an antenna for enhancing receiving and transmitting the wireless signals. Wireless coverage areas are defined around each of the wireless coverage area defining equipment 12a, 12b, 12c, 12d, 12e and 12f. Wireless coverage areas can also be referred to as cells, cellular coverage areas, wireless coverage zones, or like terms. Examples of and/or alternative terms for wireless transceivers include radio-heads, wireless routers, cell sites, wireless nodes, etc.

In the depicted example of FIG. 1, the base location 11 is shown as a base transceiver station (BTS) located adjacent to a radio tower 24 supporting and elevating a plurality the wireless coverage area defining equipment 12a. In one example, the equipment 12a can define wireless coverage areas such as a macrocells or microcells (i.e., cells each having a coverage area less than or equal to about 2 kilometers wide). The wireless coverage area defining equipment 12b is shown deployed at a suburban environment (e.g., on a light pole in a residential neighborhood) and the equipment 12c is shown deployed at a roadside area (e.g., on a roadside power pole). The equipment 12c could also be installed at other locations such as tunnels, canyons, coastal areas, etc. In one example, the equipment 12b, 12c can define wireless coverage areas such as microcells or picocells (i.e., cells each having a coverage area equal to or less than about 200 meters wide). The equipment 12d is shown deployed at a campus location (e.g., a university or corporate campus), the equipment 12e is shown deployed at a large public venue location (e.g., a stadium), and the equipment 12f is shown installed at an in-building or near-building environment (e.g., multi-dwelling unit, high rise, school, etc.). In one example, the equipment 12d, 12e, and 12f can define wireless coverage areas such as microcells, picocells, or femtocells (i.e., cells each having a coverage area equal to or less than about 10 meters wide).

Figure 2:
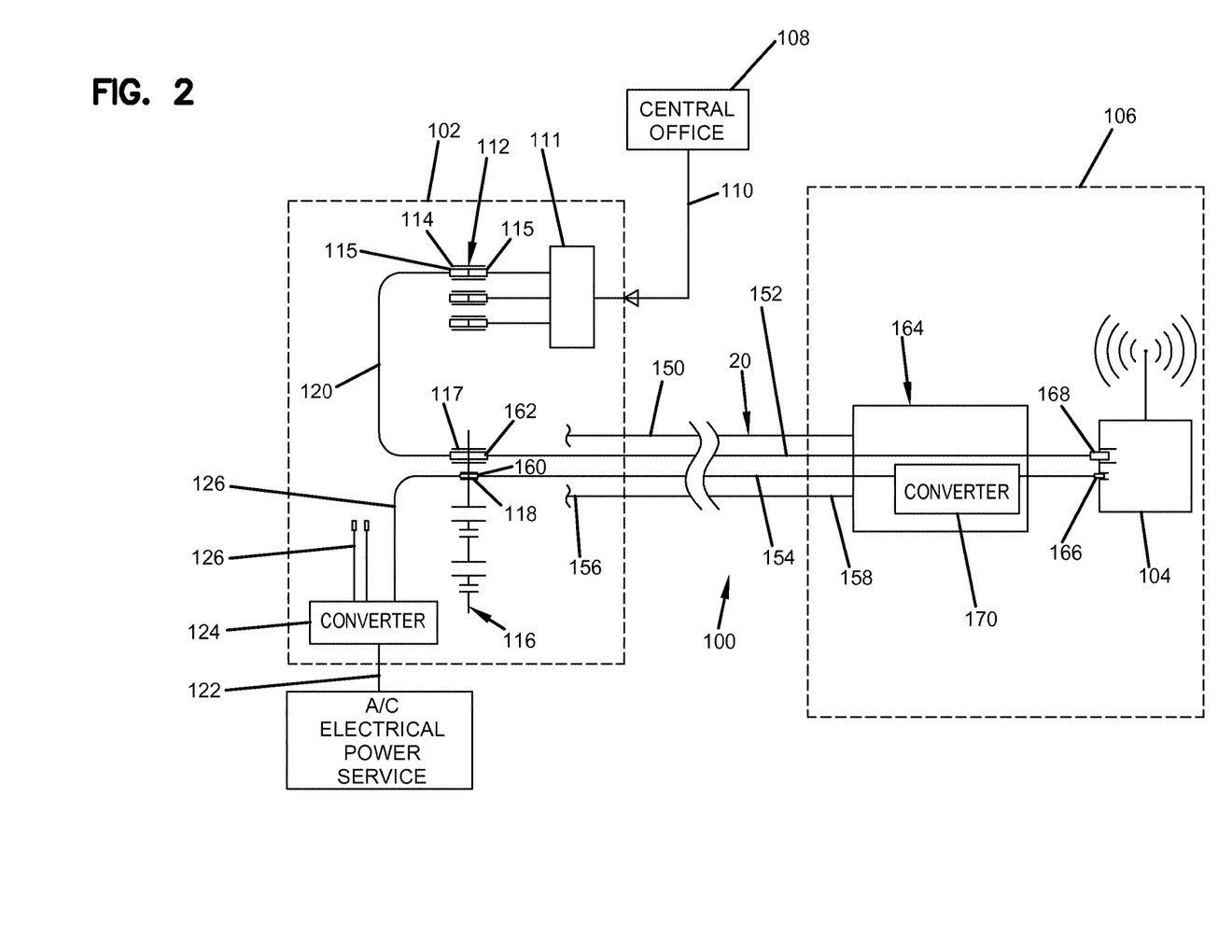
FIG. 2 shows hybrid cable system in accordance with the principles of the present disclosure.

FIG. 2 shows a cable system 100 that can be used to transmit power and communications from a first location 102 to an active device 104 at a second location 106. The second location 106 is remote from the first location 102. In certain example, the first location 102 can be a base location and the active device 104 can include wireless coverage area defining equipment. Examples of wireless coverage area defining equipment and locations where such equipment may be installed are described above. Examples of other types of active devices include cameras such as high definition video cameras.

The first location 102 receives optical signals from a remote location 108 via a fiber optic trunk cable 110. Optical fibers of the trunk cable 110 can be separated at a fan-out device 111 at the first location. Alternatively, optical power splitters or wavelength division multi-plexers can be used to split optical communications signals from the trunk cable 110 to multiple optical fibers. The fibers can be routed to a patch panel 112 having fiber optic adapters 114 (i.e., structures for optically and mechanically interconnecting two fiber optic connectors 115). The first location 102 can also include a combined power/communication panel 116 having fiber optic adapters 117 paired with power adapters 118 (i.e., ports). Connectorized fiber optic patch cords 120 can be routed from the fiber optic adapters 114 to the fiber optic adapters 117.

The first location 102 can receive electrical power from a main power line 122. In one example the main power line 122 can be part of a mains power system that provides 100-240 nominal volt alternating current (example frequencies include 50 and 60 Hertz). The first location 102 can include a converter 124 for converting the electrical power from the first voltage (e.g., 100, 120v, 220v, 230v, 240v etc. nominal voltage) to a second voltage that is less than the first voltage. In one example, the second voltage is less than or equal to 60 volts and less than or equal to 100 Watts such that the output voltage complies with NEC Class II requirements. In one example, the converter 124 is an AC/DC converter that converts the electrical power from alternating current to direct current. Connectorized power cords 126 can be used to route electrical power having the second voltage from the converter 124 to the power adapters 118. In certain examples, the combined power/communications panel 116 can include at least 18, 24, 30 or 32 fiber optic adapters paired with corresponding power adapters 118. In certain examples, the converter 124 is large enough to provide NEC Class II compliant power through separate hybrid cables to at least 18, 24, 30 or 32 active devices. Of course, converter having smaller capacities could be used as well. Additionally, the converter 124 can be part of a voltage conversion package including overvoltage protection that provides protection/grounding in the event of lightning strikes and main crosses.

A hybrid cable 20 can be used to transmit electrical power and optical communication signals between the first and second locations 102, 106. The hybrid cable 20 can include an outer jacket 150 containing at least one optical fiber 152 for carrying the optical communication signals and electrical conductors 154 (e.g., wires such as ground and power wires) for transmitting the electrical power having the second voltage. The hybrid cable 20 can include a first end 156 and a second end 158. The first end 156 can include a first interface for connecting the hybrid cable to electrical power and fiber optic communication at the first location 102. In one example, the first interface can include a power connector 160 (e.g., a plug) that connects the electrical conductors 154 to one of the connectorized power cords 126 at the power/communications panel 116. The power connector 160 can be plugged into the adapter 118 and can be provided at a free end of a cord that extends outwardly from the outer jacket 150 at the first end of the hybrid cable 20. The cord can contain the electrical conductors 154. The first interface can also include a fiber optic connector 162 (e.g., an SC connector, LC connector, ST-style connector or other type of connector) that connects the optical fiber 152 to one of the patch cords 120. The fiber optic connector 162 can plug into one of the fiber optic adapters 117 and can be mounted at the free end of a cord that contains the optical fiber 152 and extends outwardly from the outer jacket 150 at the first end of the hybrid cable 20.

The second end 158 of the hybrid cable 20 can include a second interface for connecting the hybrid cable 20 to the active device 104 such that electrical power is provided to the active device 104 and such that fiber optic communication signals can be transmitted between the first and second locations 102, 106. The second interface includes an interface structure 164 including a power connection location 166 and a communication connection location 168. In one example, the interface structure 164 includes a power converter 170 for converting electrical power carried by the hybrid cable 20 to a direct current third voltage that is less than the second voltage. In one example, the third voltage corresponds to an electrical voltage requirement of the active device 104. In one example, the power converter 170 is a DC/DC converter. In one example, the third voltage is 12V, 24V or 48V. In examples where AC current is transmitted by the hybrid cable 20, the power converter 124 can be an AC/AC converter and the power converter 170 can be an AC/DC converter. In certain examples, the interface structure 164 can include an optical-to-electrical converter for converting the communications signals carried by the optical fiber 152 from an optical form to an electrical form. In other examples, optical-to-electrical conversion can be performed by the active device 104 or can take place between the active device 104 and the interface structure 164.

In one example, the interface structure 164 includes a converter interface that allows power converters 170 with different conversion ratios to interface and be compatible with the interface structure 164. The conversion ratio of the particular power converter 170 used can be selected based on factors such as the voltage requirement of the active device 104 and the length of the hybrid cable 20. The power converters 170 can have a modular configuration can be installed within the interface structure 168 in the field or in the factory. In one example, the power converters 170 can have a "plug-and-play" interface with the interface structure. The modular configuration also allows the power converter 170 to be easily replaced with another power converter 170, if necessary. In certain examples, the interface structure 164 can include overvoltage protection and grounding arrangements such as fuses, metal oxide varistors, gas tubes or combinations thereof.

In one example, the electrical power having the third voltage can be output to the active device 104 through the power connection location 166. The power connection location 166 can include a power connector, a power port, a power cord or like structures for facilitating connecting power to the active device 104. In one example, the power connection location 166 can have a modular configuration that allows interface connectors having different form factors to be used.

In one example, the communications signals can be transferred between the hybrid cable 20 and the active device through the communication connection location 168. The communication connection location 168 can include a connector, a port, a cord or like structures for facilitating connecting to the active device 104. In one example, the communication connection location 168 can have a modular configuration that allows interface connectors having different form factors to be used. In the case where the optical to electrical converter is provided within the interface structure 164, the connection location can include electrical communication type connectors (e.g., plugs or jacks) such as RJ style connectors. In the case where the optical to electrical converter is provided at the active device 104, the communication connection location 168 can include fiber optic connectors and or fiber optic adapters (e.g., SC connectors/adapters; LC connectors/adapters, etc.). In certain examples, ruggedized, environmentally sealed connectors/adapters can be used (e.g., see U.S. Pat. Nos. 8,556,520; 7,264,402; 7,090,407; and 7,744,286 which are hereby incorporated by reference in their entireties. It will be appreciated that when the active devices include wireless transceivers, the active devices can receive wireless signals from the coverage area and such signals can be carried from the active devices to the base station 11 via the hybrid cables. Also, the active devices can covert signals received from the hybrid cables into wireless signals that are broadcasted/transmitted over the coverage area.

In one example, the second voltage is less than the first voltage and greater than the third voltage. The third voltage is the voltage required by the active device at the second location. In one example, the second voltage is sufficiently larger than the third voltage to account for inherent voltage losses that occur along the length of the hybrid cable.

Figure 3:
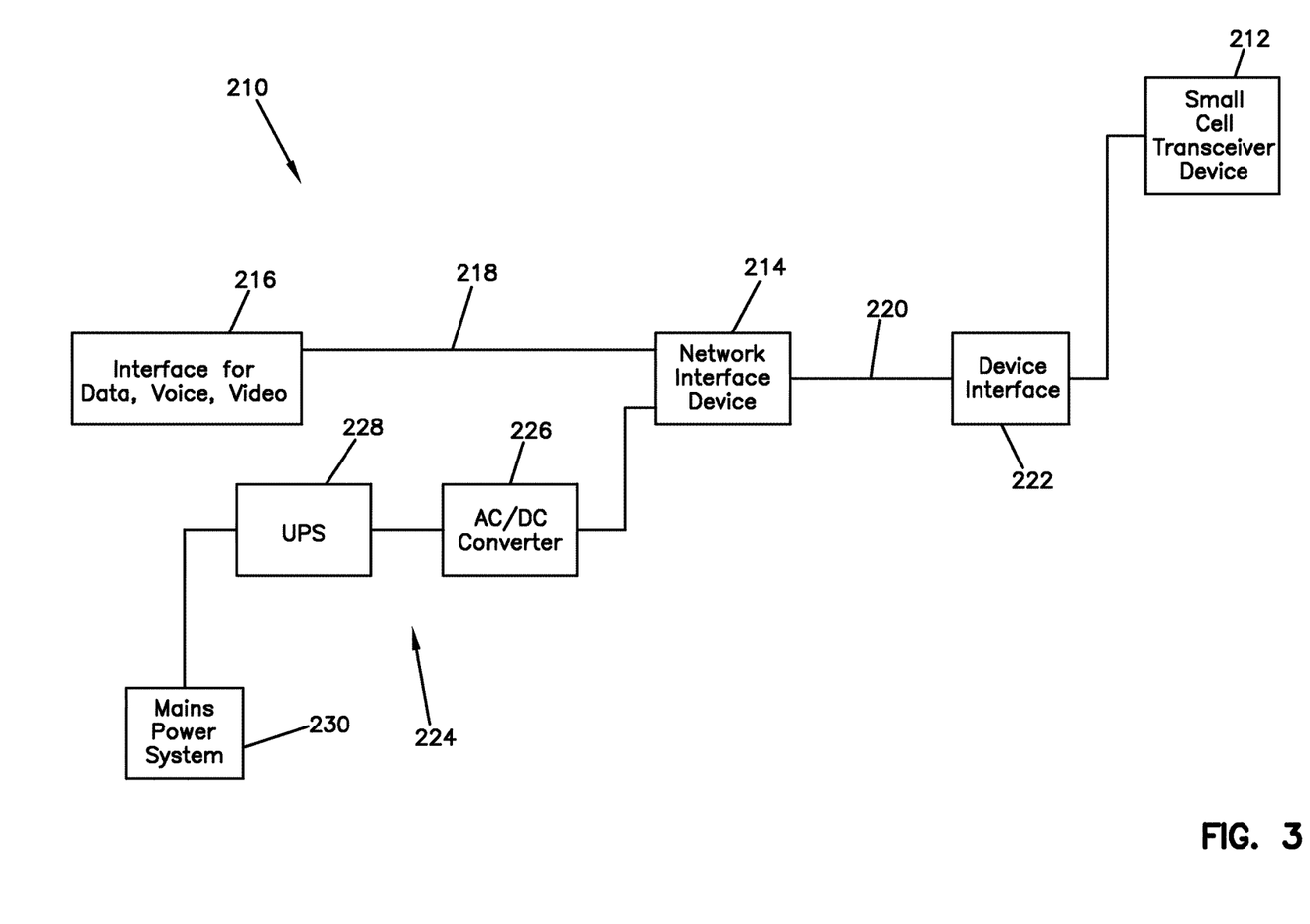
FIG. 3 shows another system in accordance with the principles of the present disclosure.

FIG. 3 shows another system 210 in accordance with the principles of the present disclosure. The system 210 is adapted for inexpensively providing optical signals and power to a relatively small number of small cell devices 212 (i.e., transceivers). In certain examples, the system 210 provides optical signals and power to only 4, 3 or two small cell devices 212. In other examples, provides optical signals and power to a single small cell device 212.

Referring to FIG. 3, the system 210 includes a network interface device 214 which typically includes a housing, box or enclosure that may mount at a subscriber location (e.g., on an exterior wall). The network interface device 214 connects to an interface 216 (e.g., a customer/subscriber interface, a central office interface, etc.) via line 218 such that two-way communication of data, voice and video can be provided between the network interface device 214 and the interface 216. In certain examples, the line 218 can include a patch cord having connectorized ends that are plugged into corresponding ports provided at the interface 216 and at the network interface device 214. In other examples, the line 218 can include spliced connections with the interface 216 and/or with the network interface device 214. In some examples, optical signals are conveyed through the line 218. In such examples, the network interface device 214 includes structure that optically couples the line 218 to an optical fiber of a hybrid cable 220 routed form the network interface device 214 to a device interface 222 that interfaces with the small cell device 212. Signals received from the hybrid cable 220 by the small cell device 212 can be wirelessly transmitted by the small cell device 212 to the coverage area. Wireless signals received by the small cell device 212 can be transmitted back through the hybrid cable 220 and the line 218 to the interface 216.

In other examples, electrical signals can be conveyed through the line 218. In such examples, the network interface device 214 can include a media converter (e.g., and electrical to optical converter) for converting the electrical signals received from the interface 216 to optical signals that are conveyed through an optical fiber of the hybrid cable 220 to the device interface 222 that interfaces with the small cell device 212. The media converter also converts optical signals received from the hybrid cable 220 to electrical signals sent to the interface 216 via the line 218. Signals received from the hybrid cable 220 by the small cell device 212 can be wirelessly transmitted by the small cell device 212 to the coverage area. Wireless signals received by the small cell device 212 can be transmitted back through the hybrid cable 220 and the line 218 to the interface 216.

The network interface device 214 also receives power from a small scale power supply 224. In one example, the small scale power supply 224 includes a small scale AC/DC converter 226 (e.g., a wall wart type device having a converter brick with an integrated or corded plug) that converts only enough power to support no more than 4, 3, 2 or 1 active devices. In one example, the small scale power supply supports only one active device per each AC/DC converter 226 provided. Thus, separate AC/DC converters 226 can be provided for each active device needed to be powered. In certain examples, each AC/DC converter 226 provides DC voltage that is less than or equal to 60 volts and less than or equal to 100 Watts. Each AC/DC converter 226 can interface with an uninterrupted power supply unit (UPS) 228 that receives power from a mains power system 230 (e.g., a power system/grid having AC power ranging from 100-240 volts). In certain examples, separate UPS 228 units can be provided for each AC/DC converter 226. The UPS 228 provides a battery back-up so that the power supply 224 continues to provide power for a predetermined amount of time even if power from the mains power system 230 is interrupted.

Figure 4:
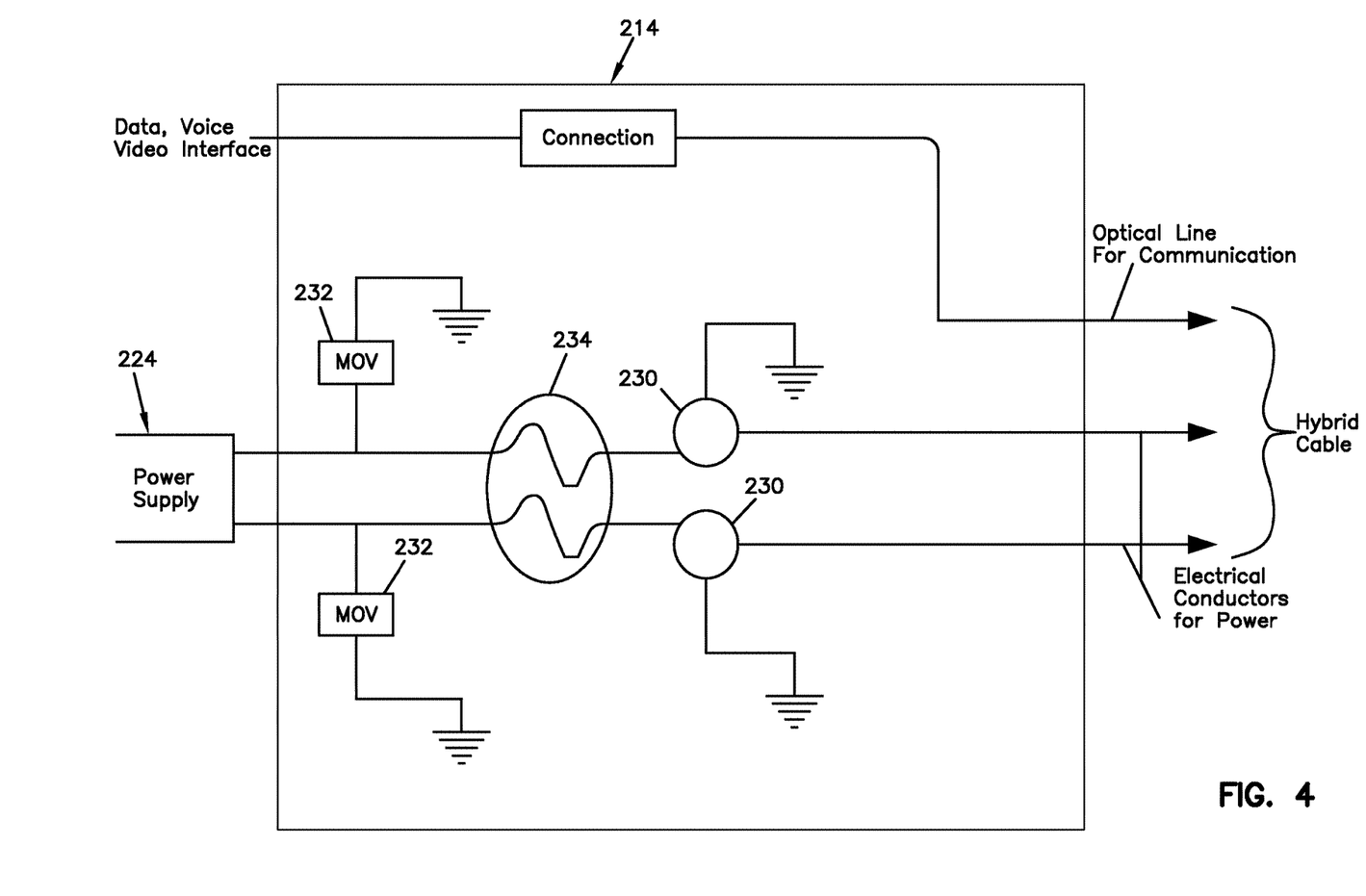
FIG. 4 is a more detailed view of a network interface device of FIG. 3.

The network interface device 214 includes circuitry for electrically connecting the power from the small scale power supply 224 to electrical conductors of the hybrid cable 220. The electrical conductors of the hybrid cable 220 carry power to the device interface 222 which supplies power to the space cell device 212. The device interface 222 can include overvoltage protection and can include voltage conversion circuitry. For example, the device interface 222 can reduce the DC voltage from the hybrid cable to a lower voltage compatible with the small cell device 212. The network interface device 214 also includes circuitry for providing overvoltage protection. In certain examples, the level of overvoltage protection provided by the interface device 214 can be compatible with or equal to the levels of safety and protection of present POTS telephone systems. As depicted at FIG. 4, the overvoltage protection provided at the network interface device 214 can include gas discharge tubes 230 that connect to ground when the interior gas is ionized by high voltage, metal oxide varistors 232 that couple to ground in response to voltage surges, and fast acting fuses 234. It will be appreciated that the various electrical components within the network interface device 214 can be circuit board mounted.

In certain examples, the AC/DC converter 226 and the UPS 228 are not housed within the housing of the network interface device 214. Instead a power line 235 directs power from the small scale power supply 224 to the network interface device 214. Conductors of the power line 235 are coupled to the conductors of the hybrid cable 220 at the network interface device 214.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A method for providing electrical power and communication signals to an active device, the method comprising:
   converting the electrical power from a mains power system from a first voltage that comprises an AC voltage to a second voltage that comprises a DC voltage at a first location;
   transmitting the electrical power having the second voltage through a hybrid cable from the first location to a second location;
   transmitting the communication signals in an optical form through the hybrid cable from the first location to the second location;
   converting the electrical power to a third voltage that comprises a DC voltage different from the second voltage at the second location;
   converting the communication signals from the optical form to an electrical form at the second location; and
   powering the active device with the electrical power having the third voltage and supplying the communication signals to the active device at the second location.

2. The method of claim 1, wherein the active device is a wireless transceiver.

3. The method of claim 2, wherein the wireless transceiver defines a picocell.

4. The method of claim 2, wherein the wireless transceiver defines a femtocell.

5. The method of claim 2, wherein the wireless transceiver defines a microcell.

6. The method of claim 1, wherein the communications signals are converted from the optical form to the electrical form at the active device.

7. The method of claim 1, wherein the electrical power having the second voltage has a voltage less than 60 volts.

\* \* \* \* \*